United States Patent [19]
Penfold

[11] Patent Number: 5,195,157
[45] Date of Patent: Mar. 16, 1993

[54] OPTICAL FIBRE SPLICING

[75] Inventor: Max Penfold, Cambridge, England

[73] Assignee: Bicc plc, England

[21] Appl. No.: 929,768

[22] Filed: Aug. 12, 1992

[30] Foreign Application Priority Data

Aug. 16, 1991 [GB] United Kingdom ............... 9117761

[51] Int. Cl.⁵ .................... G02B 6/00; G02B 6/36
[52] U.S. Cl. .................................................. 385/96
[58] Field of Search ................ 385/95, 96, 97, 98, 385/99

[56] References Cited

U.S. PATENT DOCUMENTS

| | | | |
|---|---|---|---|
| 4,812,010 | 3/1989 | Osaka et al. | 385/96 |
| 4,914,797 | 4/1990 | Tsuchida et al. | 385/96 X |
| 4,971,418 | 11/1990 | Dorsey et al. | 385/96 |
| 4,978,201 | 12/1990 | Yamada et al. | 385/96 |
| 5,009,513 | 4/1991 | Onodera et al. | 385/96 X |
| 5,146,527 | 9/1992 | Mallinson | 385/96 X |

*Primary Examiner*—Akm E. Ullah
*Attorney, Agent, or Firm*—Anthony J. Casella; Gerald E. Hespos

[57] ABSTRACT

Composite apparatus for preparing and positioning tails of two optical fibers for fusion splicing and for effecting a fusion splice between prepared and appropriately positioned tails comprises optical fiber cleaving apparatus mechanically controlled fusion splicing apparatus optical fiber holding devices and associated transfer arms and a low voltage power source, the cleaving and splicing apparatus, holding devices and associated transfer arms being housed in a casing and the low voltage power source being housed in a casing which is separately formed with respect to the casing. The low voltage power source is electrically connected to the high voltage circuitry of the splicing apparatus by a flexible electric cable. The transfer arms will transfer a holding device from a first operating station in which an optical fiber tail is held normal to the scoring edge of a blade of the cleaving apparatus to a second operating station in which the optical fiber tail is held normal to the common axis of the fusion electrodes of the splicing apparatus and in axial alignment with an optical fiber tail held by the other holding device, the prepared end faces of the aligned optical fibers being disposed between the electrodes.

15 Claims, 5 Drawing Sheets

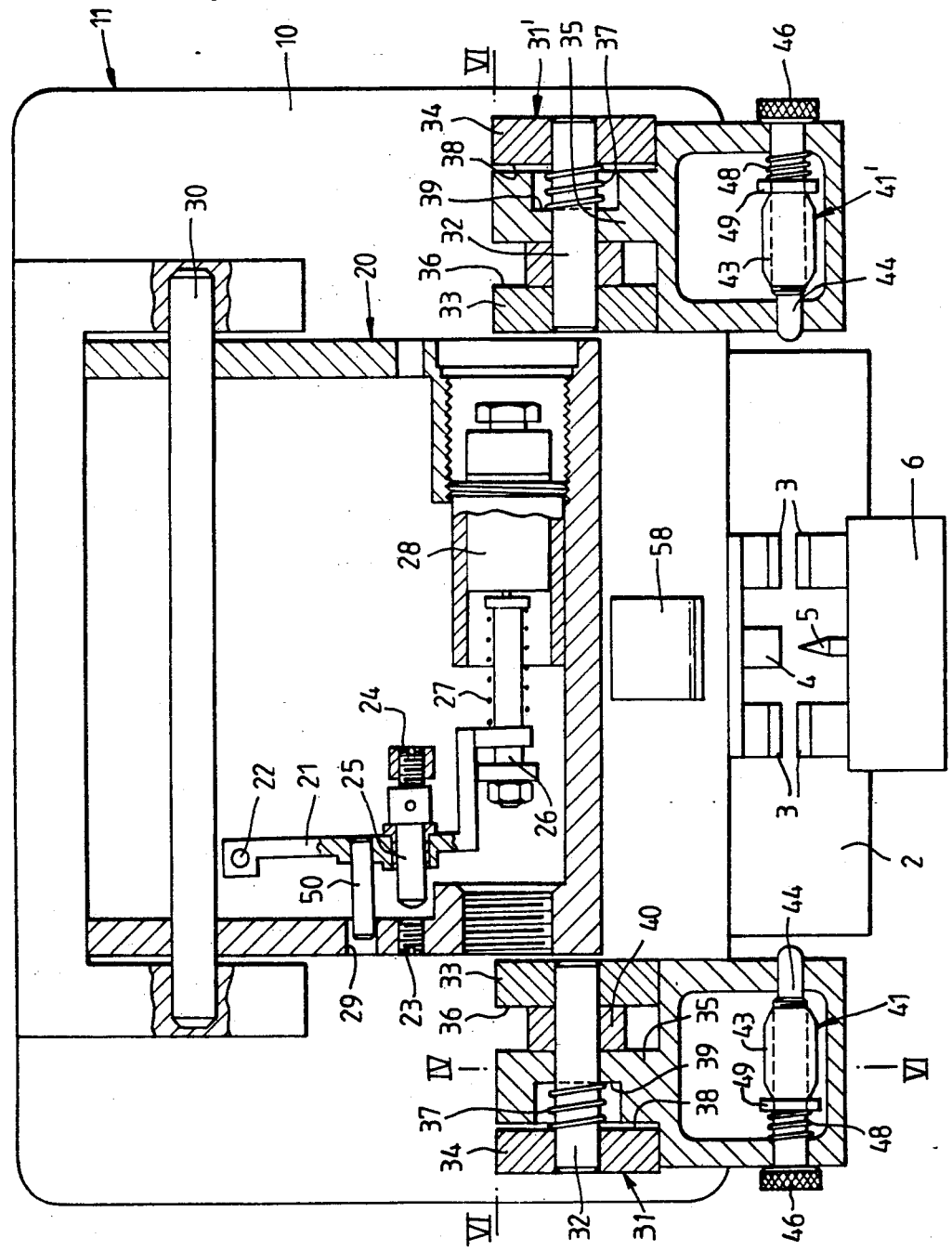

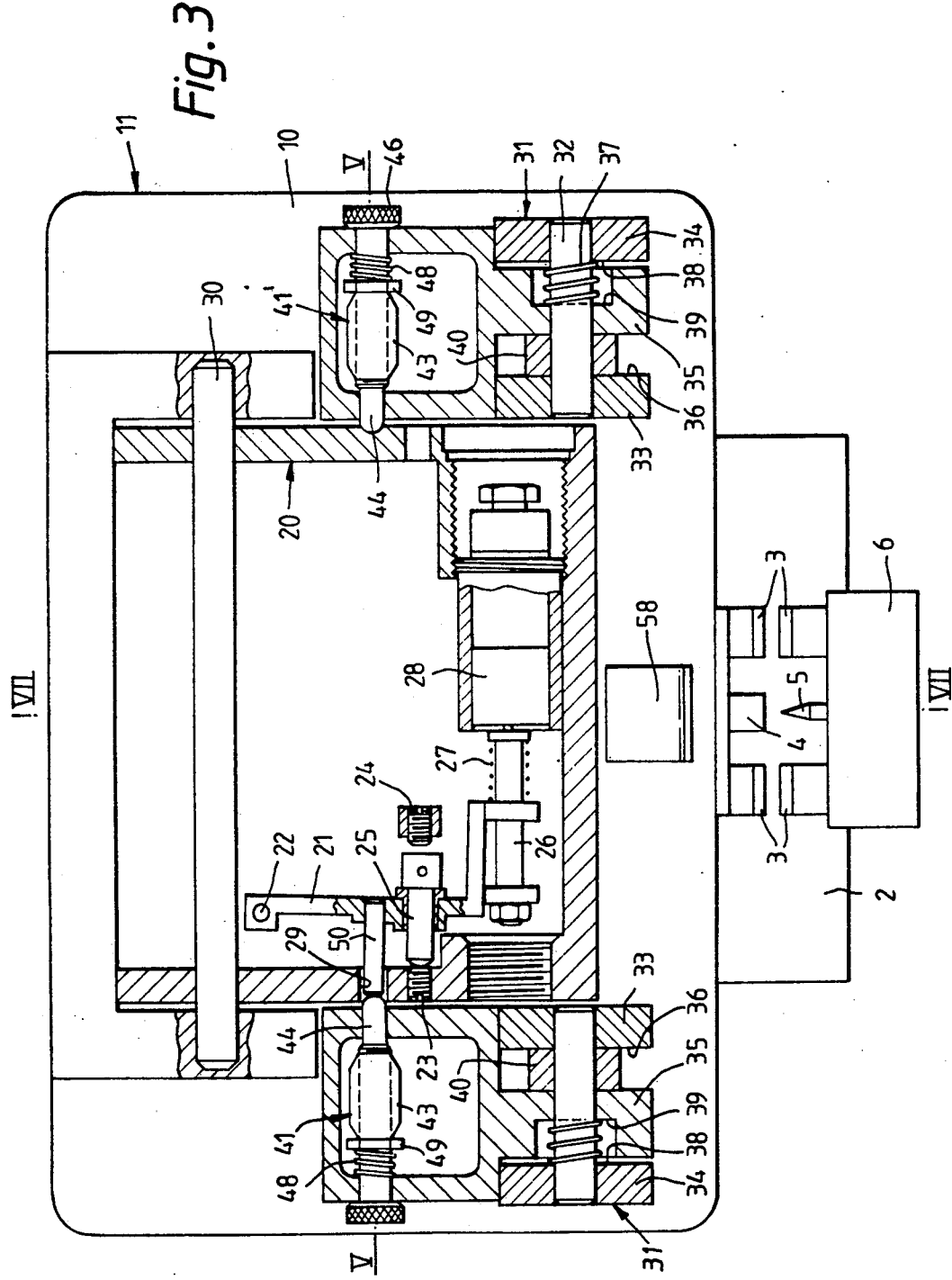

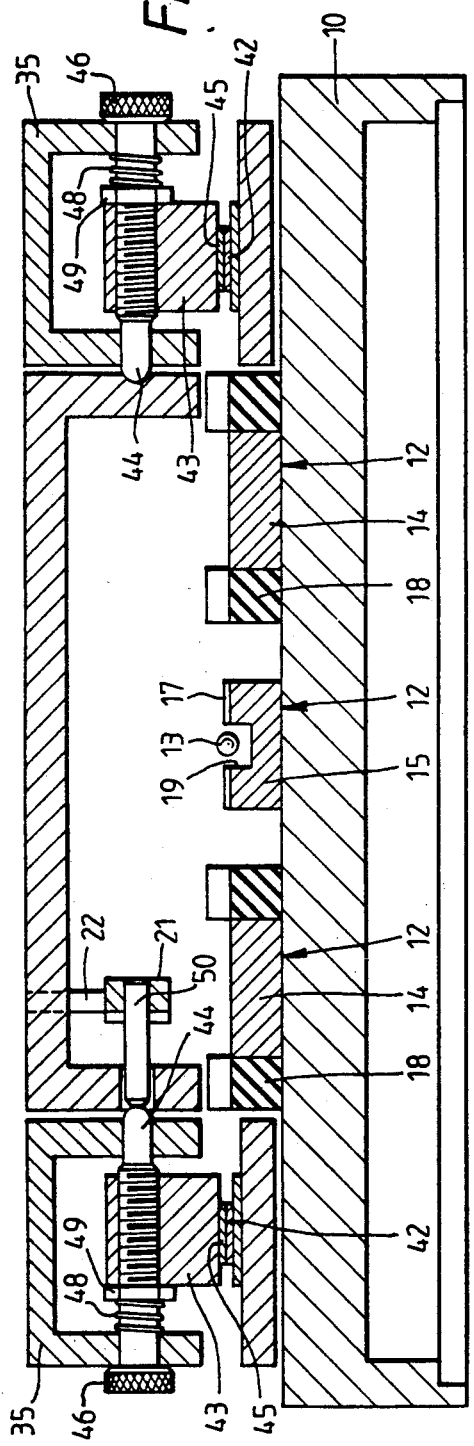
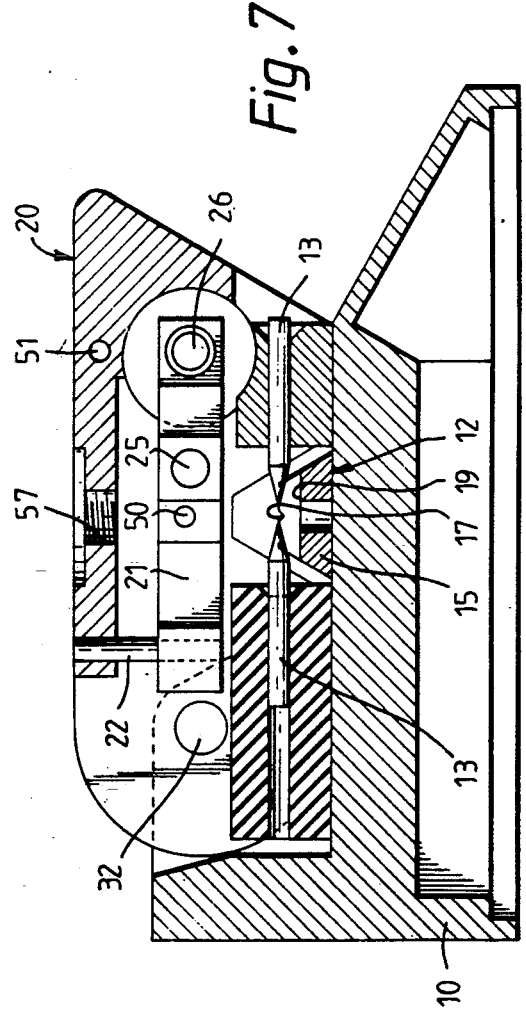

OPTICAL FIBRE SPLICING

This invention relates to apparatus for effecting a fusion splice between two optical fibres, one or each of which may be a component of an optical cable.

Effecting of a fusion splice between two optical fibres comprises three major operations, namely preparation of tails of the two optical fibres to be fusion spliced, positioning of the prepared tails of the two optical fibres for fusion splicing and fusion splicing of the prepared and positioned tails of the two optical fibres.

In preparing and positioning tails of two optical fibres for fusion splicing, it is necessary to ensure that:
(i) the tail of each optical fibre has a substantially flat end face lying in a plane radial to the fibre axis;
(ii) the tails of the optical fibres are so disposed that the cores of the tails are in substantially axial alignment for optimum transfer of light from one fibre to the other; and
(iii) the end faces of the axially aligned tails of the optical fibres are spaced a predetermined distance apart.

The subsequent fusion splicing operation comprises two stages which are effected in sequence. During the first of these two stages, the prepared tails of the two optical fibres are heated rapidly by means of an arc struck between electrodes disposed on opposite sides of the tails of the optical fibres to a temperature such that at least the extreme end parts of the tails are in a softened state and, thereafter, during the second stage of the fusion splicing operation, the end part of one or each optical fibre is moved axially towards and against the end part of the other optical fibre to a predetermined extent and at a predetermined rate for a predetermined period of time to enable the aligned and softened end parts of the optical fibres to fuse together.

It is an object of the present invention to provide improved composite apparatus for preparing and positioning tails of two optical fibres for fusion splicing and for effecting a fusion splice between said prepared and appropriately positioned tails, which improved composite apparatus is substantially less expensive and easier to use than the discrete apparatus hitherto proposed and used for effecting the aforesaid major operations.

According to the invention, the improved composite apparatus comprises optical fibre cleaving apparatus comprising an elongate table for supporting a tail of an optical fibre, a blade having a scoring edge which extends in a rectilinear direction transverse with respect to the elongate table and, disposed beyond each end of the elongate table, a device for so holding an optical fibre while it is being cleaved that the tail of the optical fibre is substantially normal to the scoring edge of the blade; splicing apparatus transversely spaced from and with respect to the elongate table of the cleaving apparatus and comprising an elongate table for supporting prepared and axially aligned tails of two optical fibres and a pair of fusion electrodes transversely spaced on opposite sides of said elongate table intermediate of its ends with their axes in axial alignment and lying in a plane containing the scoring edge of the blade of the cleaving apparatus; and means for transferring each of said optical fibre holding devices between two operating stations, in the first of which operating stations the holding device is disposed beyond the adjacent end of the elongate table of the cleaving apparatus and in the second of which operating stations said holding device is disposed beyond the adjacent end of the elongate table of the splicing apparatus, said transfer means being constrained to move the holding devices between said two operating stations in directions lying in planes substantially parallel to the plane containing the scoring edge of the blade and the axes of the fusion electrodes.

When the improved composite apparatus is to be used to prepare and position tails of two optical fibres for fusion splicing and to effect a fusion splice between said prepared and appropriately positioned tails, one of said holding devices is moved to said first operating station and a length of optical fibre is so positioned in and held by the holding device that the tail of the optical fibre protrudes from the holding device along the elongate table of the cleaving apparatus and is substantially normal to the scoring edge of the blade. The optical fibre is then cleaved to provide the tail of the optical fibre with a substantially flat end face lying in a plane radial to the fibre axis, which tail is of a length determined by the distance between a datum incorporated in said transfer means and the scoring edge of the blade. The holding device with the prepared tail of predetermined length gripped therein is then transferred by said transfer means to said second operating station so that the prepared end face of the tail of the optical fibre held in the holding device is disposed between the electrodes of the splicing apparatus. The prepared end face of the cleaved tail is then arranged to be spaced a predetermined distance from the plane containing the axes of the fusion electrodes of the splicing apparatus. The second of the two optical is then cleaved and transferred to the second operating station using the second holding device so that the tails of the two optical fibres are in axial alignment on the elongate table of the splicing apparatus. The fusion splicing operation is then effected. After the fusion spliced tails of the optical fibres are removed from the splicing apparatus by appropriate transfer of the holding devices, the fusion spliced optical fibres are removed from the holding devices.

To facilitate removal of the fusion spliced tails from the splicing apparatus, the transfer means of the two holding devices may be adapted to be so detachably coupled together that the holding devices can be transferred in unison from the second operating station.

Preferably, the elongate tables of the cleaving and splicing apparatus are so disposed that their longitudinal axes are substantially parallel to one another. The transversely extending plane containing the scoring edge of the blade and the axes of the fusion electrodes preferably is centrally disposed between the end faces of the elongate tables.

The transfer means by which each optical fibre holding device is transferred between the first and second operating stations may take any convenient form but, preferably, the transfer means comprises at least one substantially rigid arm which, at or near one of its ends, carries one of the optical fibre holding devices and which, at or near its other end, is pivotally coupled with respect to the longitudinal axis of a fixed shaft which is positioned with its axis substantially midway between and parallel to the longitudinal axes of the elongate tables of the cleaving apparatus and splicing apparatus and which extends substantially normal to the plane containing the scoring edge of the blade and the axes of the electrodes, the pivotally mounted arm or arms being constrained to transfer said holding device between said two operating stations in directions lying in a plane substantially parallel to the plane containing the scoring edge of the blade and the axes of the electrodes. The rigid arm or arms pivotally mounted on the shaft preferably is or are disposed between two stops axially spaced on and locked to the shaft and is or are urged against a flat inner face of one of said stops, which flat inner face lies in a plane parallel to the plane containing the scoring edge of the blade and the axes of the electrodes and constitutes said datum incorporated in the transfer means, by a spring carried by the shaft and disposed between the other stop and a transversely extending shoulder on the arm or one of the arms. In a preferred embodiment, each holding device comprises two jaws which are urged together by associated spring means and can be separated temporarily against the action of the spring means in order that a length of optical fibre can be disposed therebetween, one of the jaws being carried by one arm of transfer means consisting of two arms and the other jaw being carried by the other of said two arms.

The elongate table of the splicing apparatus preferably has in its upper surface for accommodating in axial alignment the prepared tails of two optical fibres to be fusion spliced, an open-ended groove which extends between the end faces of the table. Preferably, also, the upper surface of the elongate table of the splicing station has intermediate of the end faces of the table a longitudinally extending elongate recess for accommodating a preformed substantially rigid support member which, in addition to providing support for the aligned tails of the optical fibres during the fusion splicing operation, can be used to provide permanent protection for the fusion splice. To accommodate a support member which has an open-ended substantially rectilinear guide passage extending between its ends and which has, at a position intermediate of its ends for facilitating fusion splicing of aligned optical fibres, a slot or aperture which intersects said guide passage and extends transversely across the width of the support member, the elongate table of the splicing station preferably has intermediate of its ends a slot or aperture which intersects said elongate recess and extends transversely across the width of the table and which is in substantially axial alignment with the electrodes. Preferably, the elongate recess is centrally disposed between the end faces of the elongate table and the transversely extending slot or aperture of the elongate table is centrally disposed between the ends of the recess so that the lengths of the tails of two optical fibres to be fusion spliced will be substantially equal to one another.

The optical fibre cleaving apparatus may take any convenient form which will reliably and repeatedly provide each of a multiplicity of optical fibres with a substantially flat end face lying in a plane radial to the fibre axis.

The optical fibre splicing apparatus may also take any convenient form which will automatically or semi-automatically effect a fusion splice between prepared and axially aligned tails of two optical fibres but, preferably, the optical fibre splicing apparatus of the improved composite apparatus of the present invention is the optical fibre fusion splicing apparatus which is described, and claimed in the specification of our co-pending U.K. Patent Application No.9207212.3 filed on Apr. 2, 1992 and which comprises an elongate table for supporting prepared and axially aligned tails of two optical fibres and a pair of fusion electrodes transversely spaced on opposite sides of said elongate table intermediate of its ends; high voltage circuitry for striking an arc between said transversely spaced electrodes for fusion splicing axially aligned tails of two optical fibres positioned therebetween; devices disposed at or near opposite ends of the elongate table for directly or indirectly holding tails of two optical fibres that have been axially aligned on said table with their prepared end faces spaced a predetermined distance apart at a region intermediate of said holding devices and between said transversely spaced electrodes, at least a part of one of said holding devices being constrained to move to a limited extent towards or away from the other holding device in a direction substantially parallel to axially aligned tails of two optical fibres when supported on said table so that when said part of the movable holding device is constrained to move to a limited extent towards said other holding device the tail held by the movable holding device will be moved axially towards the other tail; mechanical means for controlling movement of said part of said movable holding device towards said other holding device; and a master switch for actuating said high voltage circuitry and said mechanical control means. The arrangement is such that when said switch is operated to cause an arc to be struck between the transversely spaced electrodes and to actuate said mechanical control means, the rate of controlled movement of said part of the movable holding device towards the other holding device will be such that a predetermined period of time will elapse between striking of the arc and abutment of the prepared end faces of the axially aligned tails of the fibres sufficient to bring said two tails to a softened state appropriate for fusion splicing and that, thereafter, said prepared and softened end faces will be urged into abutting relationship so that a fusion splice between said abutting axially aligned tails will be effected.

Preferably, whilst prepared and softened end faces of optical fibre tails are abutting and a fusion splice is being effected between the abutting axially aligned tails, the mechanical means for controlling movement of said part of the movable holding device towards the other holding device is also adapted to control limited movement of a least a part of one of said holding devices away from the other holding device.

Where the splicing apparatus of the improved composite apparatus of the present invention is optical fibre fusion splicing apparatus in accordance with the aforesaid co-pending patent application, after the first of the optical fibres has been cleaved by the cleaving apparatus and the holding device gripping the prepared optical fibre has been transferred from the first operating station to the second operating station, the movable part of the holding device is caused to move away from the other holding device so that when the tails of the two optical fibres are axially aligned on the elongate table of the splicing apparatus their prepared end faces will be spaced a predetermined distance apart between said transversely spaced electrodes.

The mechanical means for controlling movement of said part of the movable device towards the other holding device preferably comprises at least one main spring so disposed as to urge said part of the movable holding device towards said other holding device at said predetermined rate when the or each main spring is actuated by operation of said master switch, and at least one damper which controls the rate of movement of said part of the movable holding device under the action of said main spring or springs to provide a predetermined period of time sufficient to enable the arc struck between said transversely spaced electrodes to bring axially aligned tails of two optical fibres to an appropriate softened state before the prepared and softened end faces of the tails abut. The or each damper may itself be at least one supplementary spring which is acting against the force exerted by said main spring or springs and which must be overcome by said main spring or springs. Alternative forms of damper that may be employed include pneumatically and hydraulically controlled pistons and spring controlled rack and pinion devices.

Where the mechanical means also controls limited movement of at least a part of at least one of the holding devices away from the other holding device, preferably the two holding devices are so inter-engaged that when said part of the movable holding device has been caused to move towards the other holding device under the action of said main spring or springs to a predetermined extent, said main spring or springs directly or indirectly causes or cause said part of the other holding device to move to a limited extent away from said movable holding device.

By way of example a typical period of time sufficient for the arc to bring the axially aligned tails of two optical fibres to an appropriate softened state is 0.5 seconds; a typical period of time during which one softened tail is urged towards and against the other softened tail is one second and the time taken for a complete fusion splice to be effected is approximately three seconds.

Since the cleaving apparatus can be of a relatively small size, positioning and relative movement of the prepared and axially aligned tails to be fusion spliced are wholly mechanically controlled and the means for this purpose require little space, the composite cleaving and splicing apparatus of the present invention has the very important advantage that the cleaving apparatus; the elongate support table, transversely spaced electrodes and high voltage circuitry for striking an arc between the electrodes of the splicing apparatus; and the longitudinally spaced holding devices and associated transfer and mechanical control means can be housed in or on a casing which is separately formed with respect to a casing housing a low voltage power source which can be electrically connected to the high voltage circuitry by a flexible electric cable. In practice, the casing housing the low voltage power source preferably is adapted to be clipped or otherwise supported on a belt worn by an operator and the casing housing the cleaving and splicing apparatus, the holding devices and associated transfer and mechanical control means can be of such a size that it can be readily held in a hand of an operator.

The composite apparatus of the present invention for preparing and positioning tails of two optical fibres for fusion splicing and for effecting a fusion splice between said prepared and appropriately positioned tails has the additional important advantage that, after each optical fibre has been positioned in a holding device in the first operating station, no further handling of the optical fibres is necessary until after the fusion splice has been effected.

The invention is further illustrated by a description, by way of example, of preferred composite apparatus for preparing and positioning tails of two optical fibres for fusion splicing and for effecting a fusion splice between prepared and axially aligned tails of two optical fibres with reference to the accompanying drawings, in which:

FIG. 2 is a view from above of the preferred apparatus with the holding devices in the first operating stations and with the mechanical control means in the fired state, shown partly in section and partly in elevation;

FIG. 3 is a view from above o& the preferred apparatus with the holding devices in the second operating stations and with the mechanical control means in the loaded state, shown partly in section and in elevation;

FIG. 5 is a cross-sectional view of the splicing apparatus taken on the line V—V in FIG. 3;

FIG. 7 is a cross-sectional view of the splicing apparatus taken on the line VII—VII in FIG. 3.

Figure 1:
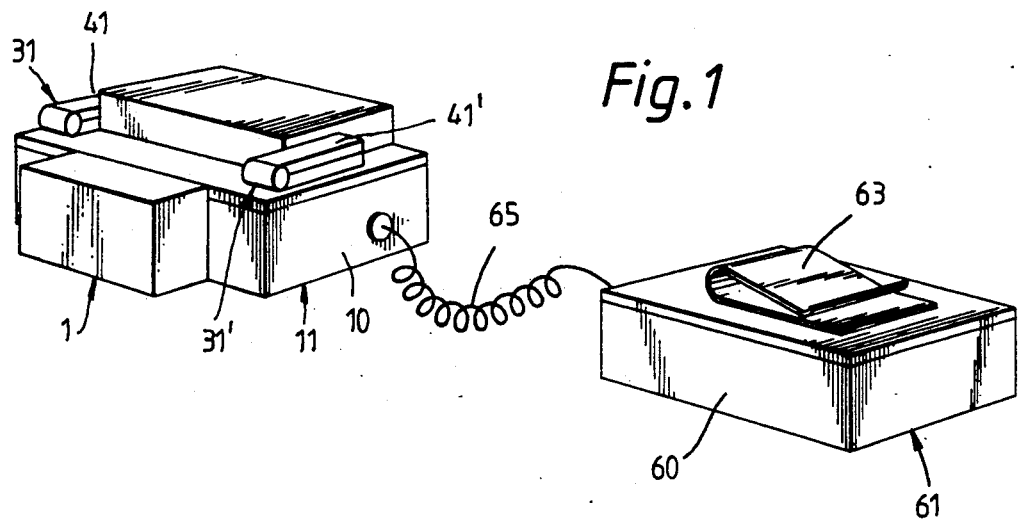
FIG. 1 is a diagrammatic pictorial view of the preferred apparatus.
Figure 4:
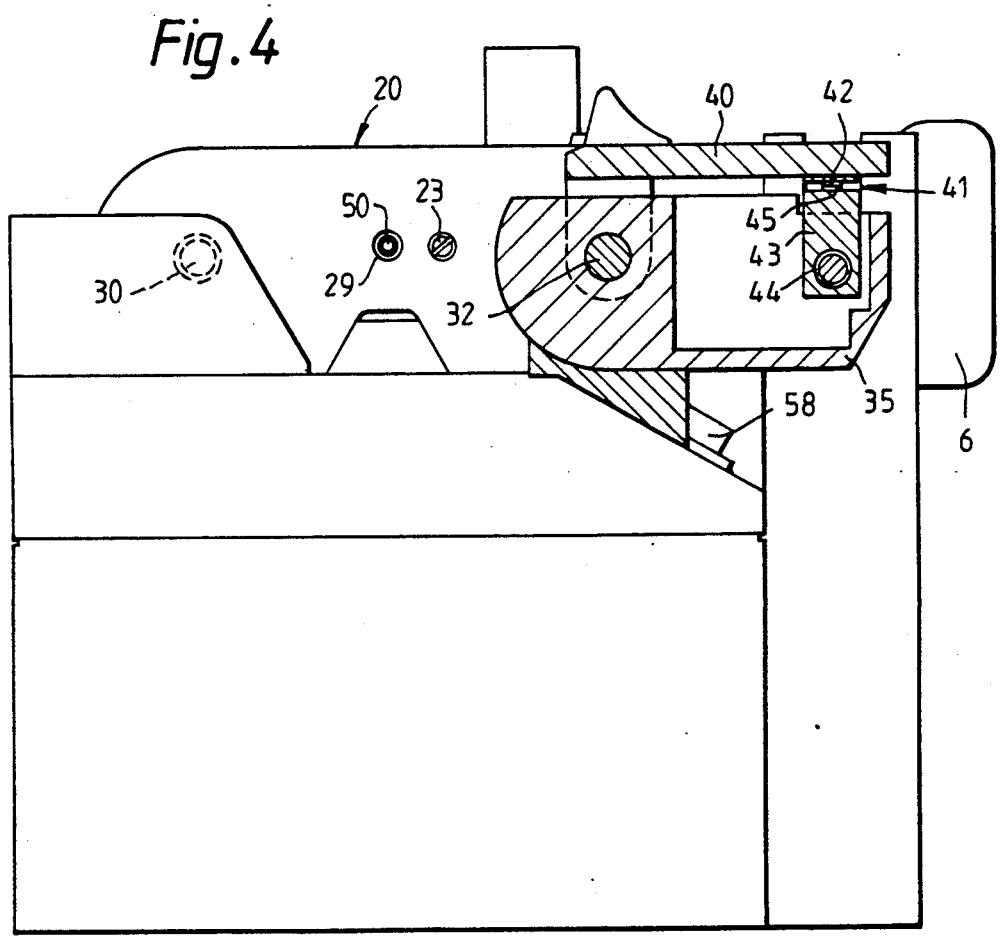
FIG. 4 is a cross-sectional view of a transfer means of the preferred apparatus taken on the line IV—IV in FIG. 2.
Figure 6:
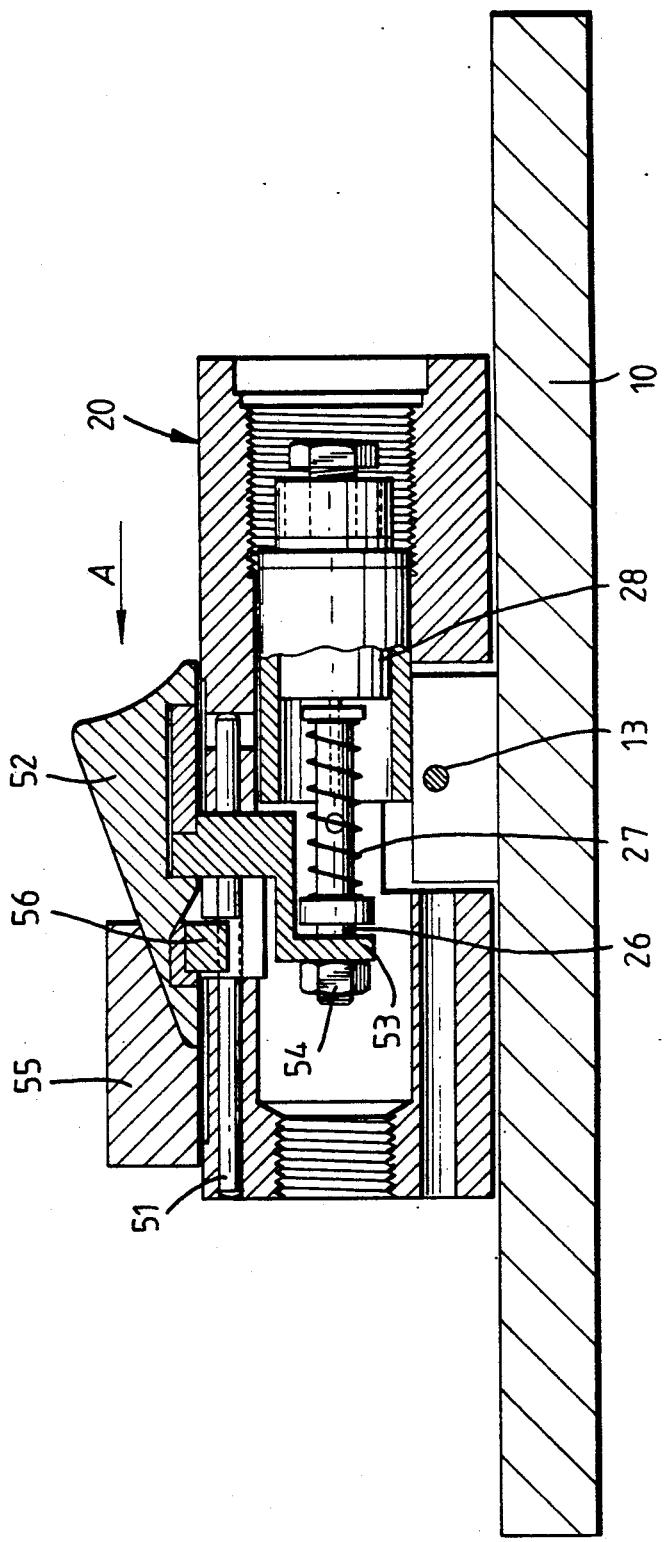
FIG. 6 is a cross-sectional view of the splicing apparatus with the mechanical control means in the fired state, taken on the line VI—VI in FIG. 2.

Referring to FIG. 1 of the drawing, the preferred apparatus comprises cleaving apparatus 1, splicing apparatus 11, optical fibre holding devices 41, 41' and associated transfer devices 31, 31' and a low voltage power source 61, the cleaving and splicing apparatus, holding devices and associated transfer devices being disposed in or on a casing 10 and the low voltage power source being housed in a casing 60 which is separately formed with respect to the casing 10. The low voltage power source 61 is electrically connected to the high voltage circuitry of the splicing apparatus 11 by a flexible electric cable 65. The casing 60 of the low voltage power source 61 has secured to its outer surface a resilient clip 63 by means of which the casing can be supported on a belt worn by an operator. The casing 10 of the cleaving and splicing apparatus is of such a size that it can be held in the hand of an operator.

As will be seen on referring to FIGS. 2 to 7 of the drawings, tho cleaving apparatus 1 includes an elongate table 2 for supporting an optical fibre to be cleaved and the splicing apparatus 11 includes an elongate table 12 for supporting prepared and axially aligned optical fibre tails to be fusion spliced, the two elongate tables being transversely spaced apart with their longitudinal axes parallel to one another. Disposed at opposite ends of the cleaving apparatus 1 and splicing apparatus 11 are transfer devices 31, 31' by means of which holding devices 41, 41' for gripping optical fibres can be transferred from first operating stations, in each of which an optical fibre can be gripped with the tail of the fibre extending across and parallel to the longitudinal axis of the elongate table 2 of the cleaving apparatus 1, to second operating stations, in each of which an optical fibre can be gripped with its prepared tail extending across and parallel to the longitudinal axis of the elongate table 12 of the splicing apparatus 11 and in axial alignment with the tail of an optical fibre gripped by the other of said holding devices 41, 41' when in said second operating station. Each transfer device 31, 31' comprises a fixed shaft 32 which is disposed on the casing 10 with its axis midway between and parallel to the longitudinal axes of the elongate tables 2, 12, a pair of stops 33, 34 axially spaced apart on and locked to the shaft and two rigid arms 35, 40 which, near one of their adjacent ends, are pivotally mounted side by side on the shaft between the stops and which, near the other of their ends, carry components of one of the optical fibre holding devices 41, 41'. To constrain each transfer device 31, 31' to move in directions lying in a plane normal to the longitudinal axes of the shaft 32 and of the elongate tables 2, 12, the parts of the rigid arms 35, 40 pivotally mounted side by side on the shaft are urged by a coil spring 37 carried on the shaft and held in compression between the inner end face of the stop 34 and a shoulder 39 on the rigid arm 35 against the inner flat end face 36 of the stop 33 lying in a plane normal to the axes of the shaft and of the elongate tables.

The cleaving apparatus 1 also includes two longitudinally spaced pairs of clamps 3 for clamping the tail of an optical fibre held in on of the holding devices 41, 41' in tension along the elongate table 2, an anvil 4, a blade 5 having a rectilinear scoring edge lying in the plane normal to the longitudinal axes of the tables 2 and 12, and an operating button 6. When the operating button 6 is pressed, the pairs of clamps 3 will grip an optical fibre tail extending across the table 2 so that the part of the tail between the pairs of clamps is in tension and the blade 5 will move in a direction normal to the longitudinal axis of the table to urge the tensioned part of the tail against the anvil 4 and to cause the edge of the blade to score the tail so that the tail is cleaved to form, on the tail, an end face lying in the plane radial to the axis of the tail.

The splicing apparatus 11 comprises the elongate table 12 and a pair of electrodes 13 transversely spaced on opposite sides of the elongate table intermediate of its ends with the axes of the electrodes lying in a plane normal to the longitudinal axis of the table and containing the scoring edge of the blade 5. High voltage circuitry (not shown) for striking an arc between the transversely spaced electrodes 13 is housed in the casing 10. The elongate table 12 comprises three separately formed component parts consisting of two end parts 14 and an intermediate part 15. The intermediate part 15 has an uppermost surface in which is formed an open-ended rectilinear groove 17 for accommodating uncoated tails of two optical fibres, the groove lying normal to the transversely-spaced electrodes 13. At each end of each end part 14 and in axial alignment with the groove 17 in the uppermost surface of the intermediate part 15 is an upstanding guide 18 for assisting in location of an optical fibre in the groove 17. Intermediate of the ends of the intermediate part 15 is a channel 19 which is normal to the rectilinear groove 17 and which is in alignment with the transversely-spaced electrodes 13.

Each holding device 41, 41' of the associated transfer device 31, 31' is a two-part clamp assembly consisting of a jaw 42 fixed with respect to the rigid arm 40 and a jaw 43 carried on a spindle 44 which is mounted in the rigid arm 35 parallel to the fixed shaft 32. The two jaws 42,43 are urged together by associated spring means (not shown) and can be separated temporarily against the action of the spring means in order that an optical fibre tail can be disposed between the jaws. The clamping surface of the jaw 42 is of a material having a low co-efficient of friction; the clamping surface 45 of the jaw 43 is of a material having a high co-efficient of friction.

The jaw 43 of each holding device 41, 41' is urged to move to a limited extent relative to the fixed jaw 42 towards the other holding device in a direction parallel to the rectilinear groove 17 in the uppermost surface of the intermediate part 15 of the elongate table 12 by a main coil spring 48 which is carried by the spindle 44 between an internal surface of the rigid arm 35 and a stop 49 on the spindle.

Pivotally mounted on a fixed main shaft 30 which is secured to the casing 10 and which extends parallel to the rectilinear groove 17 in the uppermost surface of the intermediate part 15 of the elongate table 12 between the transfer devices 31, 31' is a carriage 20 in which a lever 21 is pivotally mounted about a fixed spindle 22 which is normal to the main shaft. The extent of pivotal movement of the lever 21 can be determined by means of two adjustable stops 23, 24 disposed in the carriage 20 on opposite sides of the lever so that an electrical contact 25, which is carried by but electrically insulated from the lever and which is connected by an insulated electric cable (not shown) to the control circuit of the high voltage circuitry, will abut one or other of the stops when the lever is pivoted about the spindle 22. In the loaded position of the splicing apparatus 11 as shown in FIG. 3, the electrical contact 25 of the lever 21 is urged against the stop 23 by a damping coil spring 27 and associated damper 28 carried by shaft 26 mounted in carriage 20 and extending parallel to the main shaft 30. The lever 21 has between its ends a stud 50 which extends into a hole 29 in one side wall of the carriage 20 and which is in abutting engagement with the free end of the spindle 44 of the holding device 41 mounted in the rigid arm 35, thereby, as shown in FIG. 3, resisting motion of the jaw 43 under the action of the main coil spring 48 towards the holding device 41'. The main coil spring 48, the damping spring 27 and associated damper 28 and the pivotally mounted lever 21 constitute the principal components of the control mechanism of the splicing apparatus 11.

Loading of the control mechanism to the loaded position shown in FIG. 3 can be effected by means of a loading button 52 which is slidably mounted on a shaft 51 which is housed in the carriage 20 and which extends parallel to the main shaft 30. Secured to and dependent from the loading button 52 is a cranked lever 53 which near its free end has a hole through which the shaft 26 protrudes and which near its free end abuts a stop 54 at the free end of the shaft. By sliding the loading button 52 in the direction of arrow A (FIG. 6), the control mechanism can be loaded as shown in FIG. 3. Actuation of the control mechanism can be effected by depression of the firing button 55 which constitutes the master switch and is mounted on the top of the carriage 20 and which is adapted to release a stop 56 temporarily preventing extension of the damping spring 27.

The carriage 20 also has immediately above the transversely extending channel 19 in the intermediate part 15 of the elongate table 12 an internally screw threaded hole 57 in which a microscope (not shown) can be detachably connected.

The casing 10 of the cleaving and splicing apparatus has an on/off switch 58 by means of which electrical power must be switched on before the apparatus can be employed. The high voltage circuitry associated with the transversely-spaced electrodes 13 is conventional and will therefore not be described.

In a modification of the splicing apparatus 11 as shown in FIGS. 2 to 7, to facilitate feeding of optical fibres into the slotted guides 18 and rectilinear groove 17 of the elongate table 12, the electrodes 13 may be housed in the pivotally mounted carriage 20.

When using the preferred composite apparatus to prepare and position tails of two optical fibres for fusion splicing and to effect a fusion splice between the prepared and axially aligned tails of two optical aligned fibres, with the control mechanism in the fired state as shown in FIG. 2 and with the electrical power switched on by means of the on/off switch 58, the holding device 41 is moved to the first operating station and a length of optical fibre is so positioned and held by the holding device that the tail of the optical fibre protrudes from the jaws 42, 43 of the device along the elongate table 2 of the cleaving apparatus 1 normal to the scoring edge of the blade 5. The operating button 6 of the cleaving apparatus 1 is then pressed to cause the pairs of clamps 3 to grip the tail and hold the part of the tail between the pairs of clamps in tension and to cause the blade 5 to cleave the tensioned tail and provide it with a flat end face lying in a plane normal to the fibre axis. The cleaved tail will be of a length determined by the distance between the end face 35 of the stop 33 and the plane containing the scoring edge of the blade. By pivotal movement of the transfer device 31, the holding device 41 gripping the prepared tail is moved to the second operating station so that the prepared tail of the optical fibre is positioned in the rectilinear groove 17 of the elongate table 12 of the splicing apparatus 11 with its prepared end face lying in the plane containing the axes of the electrodes 13 and in the transversely-extending channel 19. The loading button 52 is then slid on the shaft 51 in the direction of arrow A (FIG. 6) to bring the control mechanism to the loaded state as shown in FIG. 3 so that the prepared end face of the cleaved tail is spaced at the required distance from the plane containing the axes of the electrodes 13, typically 50 micrometers. The holding device 41' is then moved to the first operating station and a length of optical fibre is so positioned in and held by the holding device that the tail of the optical fibre protrudes from the holding device along the elongate table 2 of the cleaving apparatus 1 and cleaving of the second optical fibre tail is then effected as before. The transfer device 31' is then pivoted so that the holding device 41' is moved to the second operating position in which the prepared tail of the second optical fibre is positioned in the rectilinear groove 17 of the elongate table 12 of the splicing apparatus with its end face lying in the plane containing the axes of the electrodes 13 and in the transversely-extending channel 9. The master switch constituted by the firing button 55 is then depressed to actuate the control mechanism.

On depression of the firing button 55, the stop 56 is released and the damping spring 27 gradually extends to reduce the force acting against the main spring 48. As the force exerted by the damping spring 27 gradually reduces to a value approximating to the force exerted on the stud 50 of the lever 21 by the main spring 48, the lever begins to pivot about the shaft 22 away from the adjustable stop 23 and towards the adjustable stop 24. The interruption of electrical contact between the electrical contact 25 and the adjustable stop 23 effected by pivotal movement 21 causes an arc to be initiated between the transversely-spaced electrodes 13 to bring the tails of the optical fibres to a softened state. The initiation of the arc is thus synchronised with the initiation of pivotal movement of the lever 21. The damped rate of pivotal movement of the lever 21, and hence the damped rate of movement of the jaw 43 of the two-part clamp assembly 41 and of the optical fibre held between the jaw 43 and fixed jaw 42, towards the two-part clamp assembly 41' is such that the time which elapses during the initiation of pivotal movement of the lever, consequent initiation of movement of the jaw 43 of the two-part clamp 41 and of the optical fibre tail held between the jaw 43 and the fixed jaw 42, the consequent initiation of the arc and the subsequent abutment of the prepared ends of the optical fibre tails is a predetermined period, typically 0.2 seconds, sufficient to allow the prepared ends of the tails to achieve an appropriate softened state before they abut one another.

Pivotal movement of the lever 21, and hence stuffing of the abutting ends of the tails, continues until the electrical contact 25 of the lever abuts the adjustable stop 24, thus limiting the distance by which the softened prepared ends of the tails are stuffed together after abutment.

At the end of the interval between the initiation of the arc and the abutment of the prepared and softened ends of the optical fibre tails, the power of the arc is increased to a level such that the ends of the tails fuse together to form a substantially longitudinally continuous optical fibre. The arc then continues to fire for a predetermined period, sufficient to allow the surface tension of the molten tails to correct any misalignment of the fibre axes, before being automatically extinguished. The time taken for a complete fusion splice to be effected by the splicing apparatus 11 is typically 5 seconds.

When the optical fibre fusion splice has been completed, the spliced fibres can be removed from the splicing apparatus 11 and mechanical protection for the fusion splice can be provided. The holding devices 41, 41' can then be transferred to the first operating stations by pivotal movement of the rigid arms 35 as described for preparing and positioning the tails of two further optical fibres for fusion splicing and for effecting a fusion splice between the prepared and axially aligned tails of the further optical fibres.

What I claim as my invention is:

1. Composite apparatus for preparing and positioning tails of two optical fibres for fusion splicing and for effecting a fusion splice between said prepared and appropriately positioned tails, which composite apparatus comprises optical fibre cleaving apparatus comprising an elongate table for supporting a tail of an optical fibre, a blade having a scoring edge which extends in a rectilinear direction transverse with respect to the elongate table and, disposed beyond each end of the elongate table, a device for so holding an optical fibre whilst it is being cleaved that the tail of the optical fibre is substantially normal to the scoring edge of the blade; splicing apparatus transversely spaced from and with respect to the elongate table of the cleaving apparatus and comprising an elongate table for supporting prepared and axially aligned tails of two optical fibres and a pair of fusion electrodes transversely spaced on opposite sides of said elongate table intermediate of its ends with their axes in axial alignment and lying in a plane containing the scoring edge of the blade of the cleaving apparatus; and means for transferring each of said optical fibre holding devices between two operating stations, in the first of which operating stations the holding device is disposed beyond the adjacent end of the elongate table of the cleaving apparatus and in the second of which operating stations said holding device is disposed beyond the adjacent end of the elongate table of the splicing apparatus, said transfer means being constrained to move the holding devices between said two operating stations in directions lying in planes substantially parallel to the plane containing the scoring edge of the blade and the axes of the fusion electrodes.

2. Composite apparatus as claimed in claim 1, wherein the elongate tables of the cleaving and splicing apparatus are so disposed that their longitudinal axes are substantially parallel to one another.

3. Composite apparatus as claimed in claim 2, wherein the transversely extending plane containing the scoring edge of the blade and the axes of the fusion electrodes is centrally disposed between the end faces of the elongate tables.

4. Composite apparatus as claimed in claim 2, wherein the transfer means of each optical fibre holding device comprises at least one substantially rigid arm which, near one of its ends, carries one of the optical fibre holding devices and which, near its other end, is pivotally coupled with respect to the longitudinal axis of a fixed shaft which is positioned with its axis substantially midway between and parallel to the longitudinal axes of the elongate tables of the cleaving apparatus and splicing apparatus and which extends substantially normal to the plane containing the scoring edge of the blade and the axes of the electrodes, the pivotally mounted arm being constrained to transfer said holding device between said two operating stations in directions lying in a plane substantially parallel to the plane containing the scoring edge of the blade and the axes of the electrodes.

5. Composite apparatus as claimed in claim 4, wherein the rigid arm of said transfer means pivotally mounted on the shaft is disposed between two stops axially spaced on and locked to the shaft and is urged against a flat inner face of one of said stops, which flat inner face lies in a plane parallel to the plane containing the scoring edge of the blade and the axes of the electrodes, by a spring carried by the shaft and disposed between the other stop and a transversely extending shoulder on the arm.

6. Composite apparatus as claimed in claim 5, wherein each holding device comprises two jaws which are urged together by associated spring means and can be separated temporarily against the action of said spring means in order that a length of optical fibre can be disposed therebetween.

7. Composite apparatus as claimed in claim 6, wherein the transfer means of each optical fibre holding device consists of two arms pivotally mounted side by side on said shaft between said stops, one of the jaws of the optical holding device being carried by one arm and the other jaw of the holding device being carried by the other of said two arms.

8. Composite apparatus as claimed in claim 1, wherein at least a part of one of said optical fibre holding devices is constrained to move to a limited extent towards or away from the other optical fibre holding device in a direction substantially parallel to the longitudinal axis of the elongate table of the splicing apparatus so that when said part of the movable holding device is constrained to move to a limited extent towards said other holding device the tail of an optical fibre held by the movable holding device will be moved axially towards the tail of an optical fibre held by the other holding device and wherein the splicing apparatus also includes high voltage circuitry for striking an arc between said transversely spaced fusion electrodes, mechanical means for controlling movement of said part of said movable device towards said other holding device and a master switch for actuating said high voltage circuitry and said mechanical control means, the arrangement being such that when said switch is operated to cause an arc to be struck between the transversely spaced fusion electrodes and actuate said mechanical control means, the rate of controlled movement of said part of the movable holding device towards the other holding device will be such that a predetermined period of time will elapse between striking of the arc and abutment of the prepared end faces of the axially aligned tails of the fibres sufficient to bring said two tails to a softened state appropriate for fusion splicing and that, thereafter, said prepared and softened end faces will be urged into abutting relationship so that a fusion splice between said abutting axially aligned tails will be effected.

9. Composite apparatus as claimed in claim 8, wherein the mechanical means of the splicing apparatus for controlling movement of said part of the movable holding device towards the other holding device is also adapted to control limited movement of at least a part of at least one of said holding devices away from the holding device whilst prepared and softened end faces of optical fibre tails are abutting and a fusion splice is being effected between the abutting axially aligned tails.

10. Composite apparatus as claimed in claim 8, wherein the mechanical means controlling movement of said part of the movable holding device towards the other holding device comprises at least one main spring so disposed as to urge said part of the movable holding device towards said other holding device at said predetermined rate when the main spring is actuated by operation of said master switch, and at least one damper which controls the rate of movement of said part of the movable holding device under the action of said main spring to provide a predetermined period of time sufficient to enable the arc struck between said transversely spaced electrodes to bring axially aligned tails of two optical fibres to appropriate softened state before the prepared and softened en faces of the tails abut.

11. Composite apparatus as claimed in claim 10, wherein the damper is at least one supplementary spring which is acting against the force exerted by said main spring and which must be overcome by said main spring.

12. Composite apparatus as claimed in claim 10, wherein the mechanical means for controlling movement of said part of the movable holding device towards the other holding device is also adapted to control limited movement of at least a part of at least one of said holding devices away from the other holding device, the two holding devices being so interengaged that when said part of the movable holding device has been caused to move towards the other holding device under the action of said main spring to a predetermined extent, said main spring causes said part of the other holding device to move to a limited extent away from said movable holding device.

13. Composite apparatus as claimed in claim 8, wherein the cleaving apparatus; the elongate support table, transversely spaced electrodes and high voltage circuitry of the splicing apparatus; the longitudinally spaced holding devices and associated transfer and mechanical control means are housed in a casing and a low voltage power source is housed in a casing which is separately formed with respect to the casing of the splicing apparatus, which power source can be electrically connected to the high voltage circuitry by a flexible electric cable.

14. Apparatus as claimed in claim 13, wherein the casing housing the low voltage power source is adapted to be supported on a belt worn by an operator.

15. Apparatus as claimed in claim 13, wherein the casing housing the cleaving apparatus, the splicing apparatus with its elongate table and electrodes, the high voltage circuitry, and the holding devices and associated transfer and mechanical control means is of such of a size that it can readily be held in the hand of an operator.

* * * * *